United States Patent [19]

Tienor et al.

[11] Patent Number: 5,072,664
[45] Date of Patent: Dec. 17, 1991

[54] SHELL MAKER APPARATUS

[75] Inventors: Lawrence J. Tienor; John L. Shope, Jr., both of Eau Claire, Wis.

[73] Assignee: National Presto Industries, Inc., Eau Claire, Wis.

[21] Appl. No.: 522,155

[22] Filed: May 10, 1990

[51] Int. Cl.⁵ .............................................. A47J 37/12
[52] U.S. Cl. ....................................... 99/353; 99/403; 99/426; 99/449; 99/450
[58] Field of Search .......... 99/340, 349, 403, 410–418, 99/426, 428, 449, 450, 450.6; 425/383, 398, 399; 426/496, 512; 126/369; 16/110 A, 114 A, 110 R

[56] References Cited

U.S. PATENT DOCUMENTS

| | | | |
|---|---|---|---|
| 902,181 | 10/1908 | Tidow | 99/411 |
| 1,672,738 | 6/1928 | Stampley | 99/411 |
| 2,593,549 | 4/1952 | Finch | 99/411 |
| 3,424,076 | 1/1969 | Bernatz et al. | 99/426 |
| 3,508,485 | 4/1970 | Munsey | 99/412 |
| 3,653,337 | 4/1972 | Hanson . | |
| 3,680,474 | 8/1972 | Brown . | |
| 3,705,042 | 12/1972 | Muse . | |
| 3,745,911 | 7/1973 | Kennedy, Jr. et al. | 99/426 |
| 3,759,165 | 9/1973 | Wallace | 99/450 |
| 3,817,163 | 6/1974 | Kizziar et al. . | |
| 4,154,156 | 5/1979 | Brignall | 99/426 |
| 4,173,926 | 11/1979 | Brignall | 99/349 |
| 4,535,688 | 8/1985 | Bentson | 99/353 |
| 4,571,887 | 5/1985 | Childress . | |
| 4,949,453 | 1/1985 | Bentson . | |

Primary Examiner—Timothy F. Simone
Attorney, Agent, or Firm—Merchant, Gould, Smith, Edell, Welter & Schmidt

[57] ABSTRACT

An apparatus is described for use in forming a flexible food item into a rigid bowl-shaped shell during submersive cooking which includes a support member and a basket with a base portion and a side wall portion. The apparatus further has structure for positioning the food item to be formed between the support member and the base portion of the basket during operation. The apparatus further has structure which permits folding of at least a portion of an outer periphery of the food item which extends beyond the base portion when the food item is operatively positioned between the support member and the basket. The apparatus permits folding by the oil during submersion of at least a portion of the outer periphery of the food item from a position away from the side wall portion of the basket to a position adjacent the side wall portion of the basket. A method is also described for cooking a flexible food item in a container of oil to form a rigid bowl-shaped shell by permitting the oil to fold at least a portion of an outer periphery of the food item relative to a center portion of the food item.

15 Claims, 4 Drawing Sheets

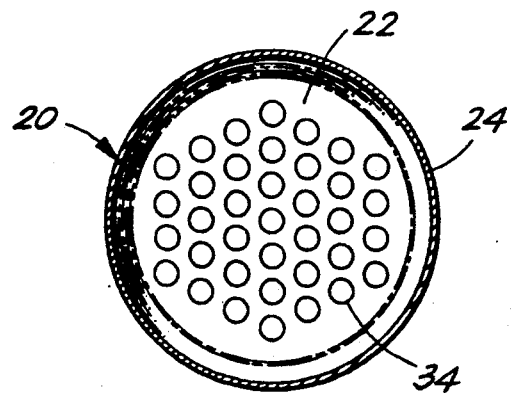
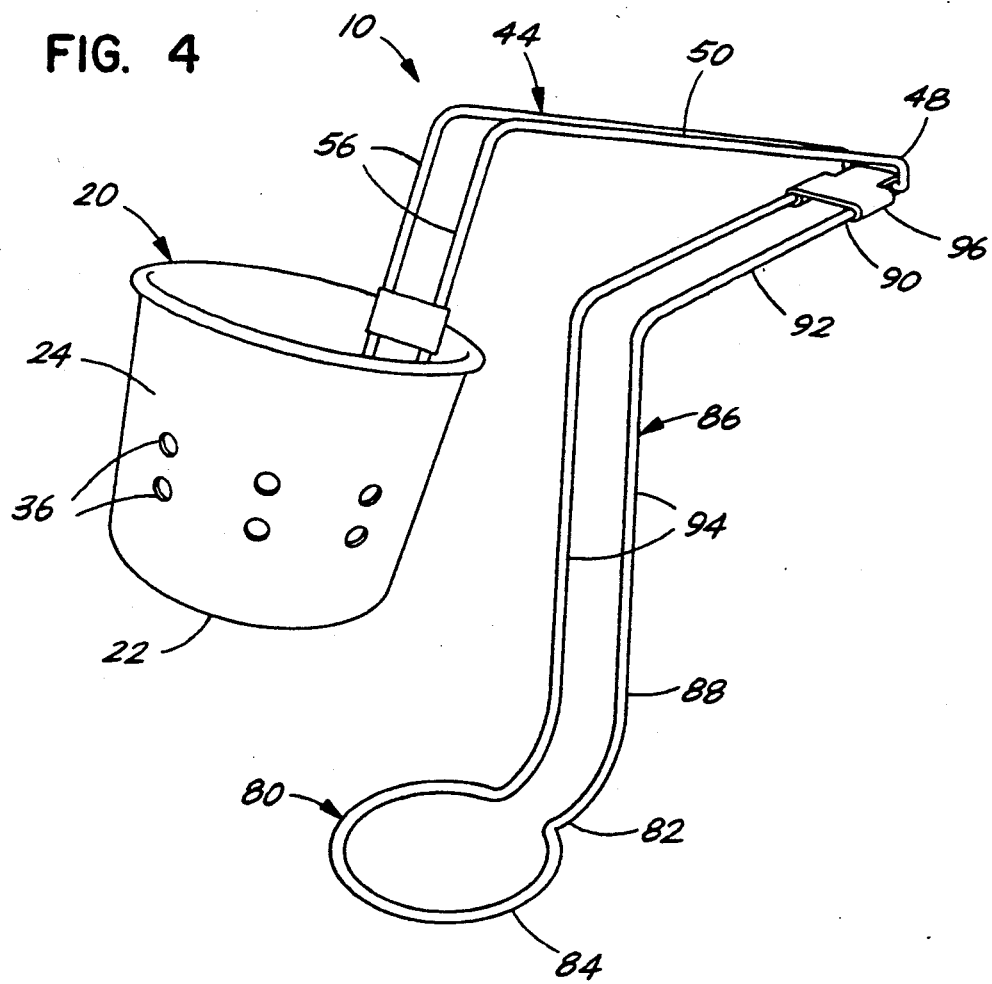

SHELL MAKER APPARATUS

FIELD OF THE INVENTION

This invention relates generally to forming a thin, flat, flexible food item into a rigid, thin-walled, bowl-shaped shell. More particularly, this invention relates to a shell maker apparatus for use in forming a flexible food item into a rigid bowl-shaped shell. This invention also relates to a method for forming a flexible food item into a rigid bowl-shaped shell during submersive cooking in oil.

BACKGROUND OF THE INVENTION

In a variety of manners, thin, flat, flexible food items have been formed into rigid, thin-walled, bowl-shaped shells to create edible bowls for holding food. The flexible food items are often circular tortillas made with flour or corn. The flexible tortillas or other food items are sometimes made rigid by submersing them in heated oil and cooking them until rigid. By maintaining the tortillas or other food items in a particular shape for a sufficient time during submersive cooking, they will retain that shape upon removal from the oil. Such items are often used, for example, as salad bowls.

In some instances, a shell maker apparatus has been employed to form or mold the flexible tortillas or other food items into a bowl shape. Some conventional shell maker apparatus employ two mating baskets to form the flexible tortilla into the bowl shape between the two baskets. In some of those shell maker apparatus, the flexible tortilla is preformed into a bowl shape between the two mating baskets and then cooked until it becomes rigid. While the tortilla is flexible before insertion into the oil, it, nonetheless, can be easily torn if folded or bent too much. One problem with these mating basket apparatus that preform the tortilla into the bowl shape is that they may cause tearing the tortilla during loading. That is, the tortilla is folded or bent before submersion, and it is not until after submersion in the hot oil that the tortilla becomes most flexible and less likely to tear upon bending.

Another kind of mating basket shell maker apparatus partially forms the tortilla into a bowl shape before submersing the tortilla into the oil. Then, shortly after submersion, when the tortilla is more flexible, the apparatus is manipulated to further form the tortilla into the final bowl shape for cooking until rigid. While this apparatus may take advantage of the tortilla being more flexible subsequent to submersion, the apparatus does require manipulation after the apparatus has been submersed into the oil which must be properly timed to form the tortilla to its final shape.

Another problem encountered with some conventional shell maker apparatus that have mating baskets is caused by structure which interferes with the cooked shell. When forming a flat tortilla into a bowl-shaped shell during submersive cooking, fins, folds, bubbles and or other irregularities may form along the sides of the shell during cooking. Once the shell becomes rigid, it is easily broken. If the fins, bubbles, folds, irregularities form around structure or framework of the apparatus, it may be difficult or impossible to remove the cooked shell from the apparatus without breaking the shell. In particular, one kind of shell maker apparatus has baskets made from wire (i.e. a wire framework system) having large spaces between the wires that the fins, bubbles, folds, irregularities can easily pass through.

An additional problem encountered with some conventional shell maker apparatus having mating baskets is that the apparatus may not be readily able to form a sufficiently deep shell relative to the dimensions of the base of the shell to provide a proper sized bowl for holding food. In general, when a bowl shape is formed from a flat, circular tortilla, the fins along the side of the shell will become larger as the depth of the shell is increased relative to the dimensions of the base of the shell. In one kind of mating basket apparatus, the baskets form the tortilla into the bowl shape by tightly pressing the tortilla between the two baskets. When there is tight pressing along the portion of the tortilla that will form the sides of the shell, especially in the case of the deeper shells, the fins may not be properly formed or properly cooked.

Another problem encountered with conventional shell maker apparatus having mating baskets results from requiring a second outer basket sized to mate with an inner basket. Because the second basket is required, the apparatus requires more material to manufacture the apparatus. Also, a bulkier apparatus, which is more difficult to handle during use and to clean after use, results.

Due to the popularity of edible bowls made from tortillas and the like, there has been a continuing need for improvements in apparatus and methods to provide for convenient preparation of the bowls. New techniques addressing the above recited problems, or similar problems, have been especially needed.

SUMMARY OF THE INVENTION

According to the principles of the present invention, an apparatus is provided for use in forming a flexible food item into a rigid bowl-shaped shell during submersive cooking. The flexible food item has a center portion and an outer periphery surrounding the center portion. The apparatus forms the flexible food item into the bowl-shaped shell by permitting folding or bending of at least a portion of the outer periphery of the food item relative to the center portion of the food item. The food item retains its folded shape upon cooking until rigid. Preferably the arrangement is such that the most, or a significant portion, of the folding occurs as the food item is submersed in hot oil during cooking. More preferably, the natural buoyancy of the food item in the oil is used to generate the folding during submersion.

The apparatus preferably has a basket with a base portion and a side wall portion. The apparatus preferably further has a support member. The apparatus preferably further has structure for positioning, and in preferred embodiments securely pressing, the food item to be formed between the support member and the base portion of the basket during submersive cooking. During submersive cooking, the oil folds at least a portion of the outer periphery of the food item from a position away from the side wall portion of the basket to a position adjacent the side wall portion. During folding of the food item, the food item is formed around the basket into a bowl-shaped configuration. In a more preferred embodiment, at least a portion of the food item is foldable from a position in a plane of the base portion of the basket to a position adjacent the side wall portion.

In a more preferred embodiment the basket has a substantially truncated conical shape with the base portion of the apparatus being located at an end of the basket having the smaller diameter. The preferred basket also has a porous base portion to the passage of oil. The preferred support member has a planar portion which engages a lower surface of the food item during operation. In the more preferred embodiment, the base portion of the basket engages an upper surface of the food item to press the food item between the planar portion of the support member and the base portion of the basket. In a most preferred embodiment, the planar portion of the support member has a substantially circular ring portion with an open interior to the passage of oil.

In a preferred embodiment, the basket has an elongate basket handle arrangement mounted on the basket and extending from the basket. The preferred support member has an elongate support handle arrangement mounted on the support member. In the preferred embodiment, a portion of the support handle and a portion of basket handle are pivotally mounted to one another to permit relative movement of the basket and the support member in a convenient manner facilitating use.

In another preferred embodiment of the present invention, the apparatus has a basket having a side wall portion that has an upward dimension at least one-third as great as a diameter of a base portion of the basket. A basket with these dimensions permits the apparatus to conveniently form a food item into a relatively deep bowl. A more preferred embodiment has a side wall portion that has an upward dimension at least one-half as great as the diameter of the base portion of the basket.

The basket in the preferred embodiment further has a porous side wall portion which is porous to the passage of oil. A porous side wall portion permits the apparatus to produce a more evenly cooked food item. A preferred basket has a side wall porosity no greater than one-half of the total area of the side wall portion. A basket with this porosity will reduce the likelihood of interference by the basket with the cooked shell. The basket in a more preferred embodiment has a side wall porosity no greater than one-fourth of the total area of the side wall portion. Most preferably, the sidewall is at least somewhat porous to the passage of oil to facilitate cooking.

According to the principles of the present invention, a method is provided for cooking a flexible food item in a container of oil to form a rigid bowl-shaped shell. The flexible food item has a center portion and an outer periphery surrounding the center portion. A cooking apparatus grips, pinches, or presses the center portion of the food item, but not the outer periphery. The cooking apparatus and the food item are then submersed in oil, with the food item outer periphery oriented so it can fold upwardly. The oil folds at least a portion of the outer periphery of the food item relative to the center portion of the food item to form the food item into a bowl-shaped shell.

A cooking apparatus may be provided that has a support member and a basket with a flat base portion and a side wall portion. The base portion of the basket is smaller than a diameter of the food item. The food item is first positioned between the base portion of the basket and the support member. Upon submersion of the cooking apparatus and the food item in oil, the food item will form into the bowl-shaped shell around the basket.

Preferably, the food item is buoyant in oil. Upon submersion in oil, the outer periphery will float toward the surface to fold the outer periphery relative to the center portion.

After a period of time following submersion, the folded food item will be cooked rigid such that upon removal from the oil, the food item will retain its submersed folded configuration.

BRIEF DESCRIPTION OF THE DRAWINGS

FIG. 3 is a partial top view of the shell maker apparatus shown in FIG. 1 showing a basket;

FIG. 4 is a perspective view of the shell maker apparatus shown in FIG. 1 with the basket pivoted relative to a support member;

DETAILED DESCRIPTION OF THE PREFERRED EMBODIMENTS

As required, a detailed disclosure of the present invention is provided herein. The detailed descriptions of arrangements and methods will be understood to be exemplary only, to provide support for the claims. That is, the arrangements and methods described herein are not to be interpreted as limiting, but rather as providing a representative basis for the claims presented herein.

The present invention includes both an apparatus for use in forming a flexible food item into a rigid bowl-shaped shell during submersive cooking, and a method of doing the same. In general, both the apparatus and the method form the food item by permitting folding or bending of a portion of an outer periphery of the food item relative to the center portion of the food item during submersive cooking. The description which follows explains both the apparatus and the method in greater detail.

APPARATUS

Figure 1:
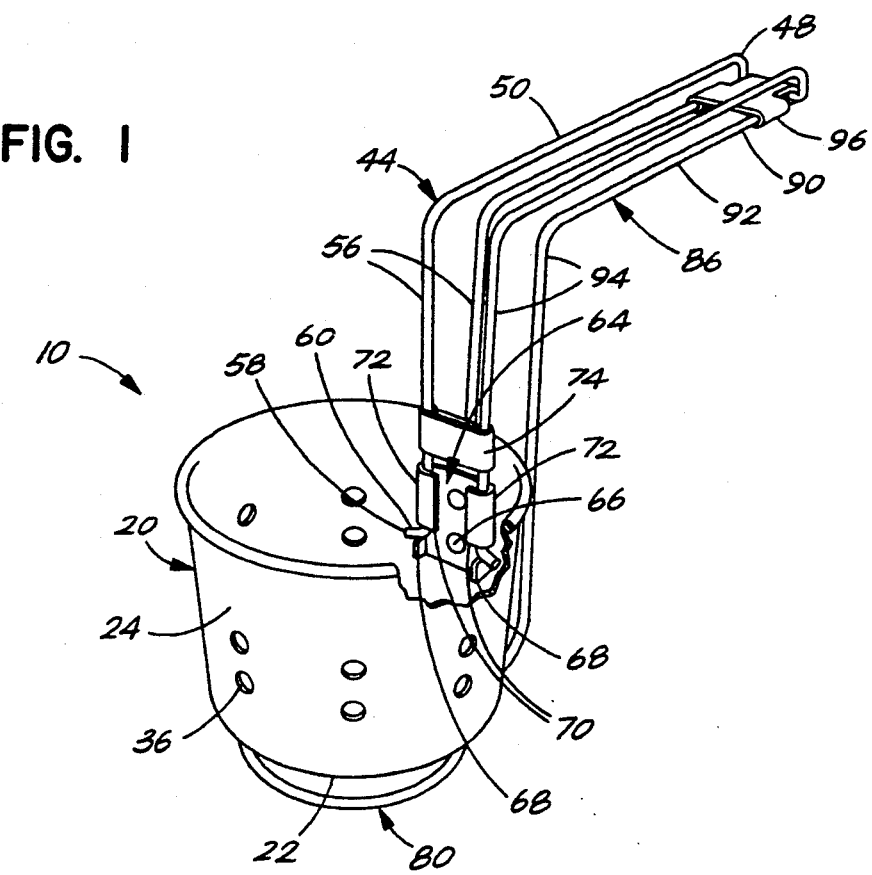
FIG. 1 is a perspective view of a first preferred embodiment of a shell maker apparatus with a partial cut away of a side wall portion.
Figure 2:
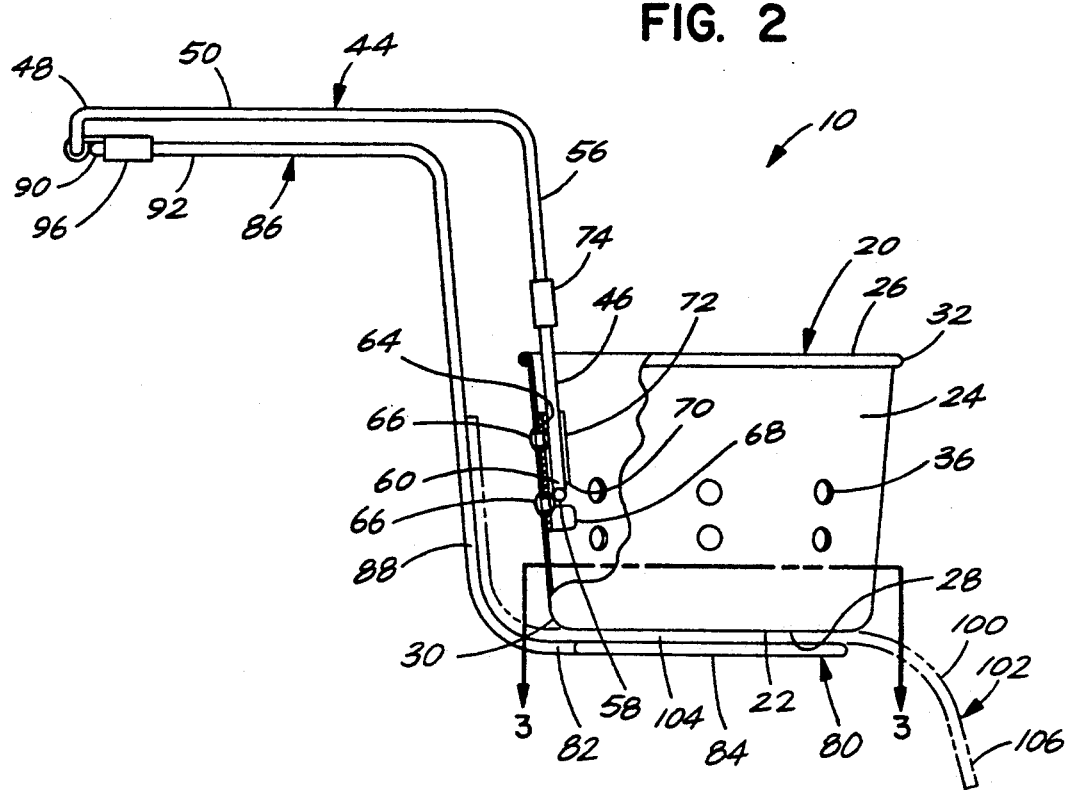
FIG. 2 is a side view of the shell maker apparatus shown in FIG. 1, with a partial cut away of the side wall portion and further showing, in phantom lines, a food item positioned in the apparatus.

Referring now to FIGS. 1-6, which illustrate a first preferred embodiment of a shell maker apparatus 10, a basket 20 is formed from a base portion 22 and an upwardly extending side wall portion 24. In a more preferred embodiment, the base portion is substantially flat. In the preferred embodiment, the base portion 22 has a substantially circular diameter and the side wall portion 24 has a substantially circular cross-sectional shape. The base portion 22 and the side wall portion 24 form a hollow basket with one end, a top end 26, open and the other end, a bottom end 28, closed off by the base portion. As shown in FIG. 2, the apparatus is in the position of which it typically is in during submersion with the top end 26 being positioned toward the top of the paper and bottom end 28 being positioned toward the bottom of the paper. It should be noted that during use, the apparatus 10 could have various orientations.

In a more preferred embodiment, the basket 20 has a substantially truncated conical shape with the base portion located at the bottom end 28 of the basket which has the smaller diameter. In a most preferred embodiment, the shape of the basket is frustoconical, where a plane formed by the base portion 22 of the basket 20 and a plane formed by the top end 26 of the basket 20 are parallel, and both of those planes are perpendicular to a longitudinal axis of the circular basket 20.

In the preferred embodiment, the base portion 22 of the basket 20 and the side wall portion 24 of the basket 20 meet to form a smooth rounded portion 30 that does not have a sharp edge. The rounded portion 30 reduces the likelihood of tearing of a food item by the apparatus during use. FIG. 2 best illustrates the rounded portion 30 between the base portion 22 and the side wall portion 24. A rim 32 is formed at the top end 26 of the basket 20. In a most preferred embodiment, the basket 20 is formed from a thin, lightweight material, like aluminum, that is of the type that is readily usable in cooking apparatus.

The base portion 22 of the preferred basket 20 is sufficiently porous such that oil may pass therethrough. However, it should be appreciated that the shell maker apparatus could be designed with a base portion that was not porous to the passage of oil and yet still function adequately as a cooking apparatus according to the general principles of this invention. As illustrated in FIG. 3, the base portion 22 has a plurality of base portion perforations 34 that permit oil to pass through the base portion 22 of the basket 20. It should be appreciated that the shapes and pattern of the base portion perforations 34 shown in FIG. 3 are merely exemplary of the various shapes and patterns possible for the base portion perforations for a shell maker apparatus 10 having a porous base portion 22. The base portion perforations 34 could have various other shapes and patterns as long as they permit the base portion to be sufficiently porous to the passage of oil. As will be discussed below in greater detail, the porous base portion 22 which is porous to the passage of oil helps to produce a more desirable final food product during submersive cooking of the food item by permitting the oil to better contact the food item. The porous base portion also permits oil to enter the interior of the basket to reduce the force necessary to submerse the basket in a container of oil.

In the preferred embodiment, the side wall portion 24 of the basket is also porous to the passage of oil. As shown in FIGS. 1, 2, and 4, the side wall portion 24 has a plurality of side wall perforations 36 large enough to permit the passage of oil through the side wall portion. It should be appreciated that the shapes and pattern of the side wall portion perforations 36 as shown in the Figures are merely exemplary of the various shapes and patterns possible for the shell maker apparatus 10. The side wall perforations 36 could have various other shapes and patterns as long as they permit the side wall portion 24 to be sufficiently porous to the passage of oil. Preferably, they are shaped as shown, so they do not present edges likely to catch on, or damage, a food item during use. As will be discussed below in greater detail, a porous side wall portion 24 which is porous to the passage of oil helps to produce a more desirable final food product during submersive cooking of a food item by permitting the oil to better contact the food item and they also make the cooking process easier.

As shown in FIGS. 1, 2, and 4, the preferred embodiment of shell maker apparatus 10 has an elongate basket handle arrangement or basket handle 44 mounted on the basket 20 at one end 46 of the basket handle 44. The basket handle 44 extends away from the basket 20 toward a distal end 48 of the basket handle. The distal end 48 of the basket handle 44 provides a gripping surface 50 for holding or moving the basket 20 without directly handling the basket. As best shown in FIG. 2, the basket handle 44 has a generally L-shaped cross sectional area. In a more preferred embodiment, the basket handle 44 is mounted on the basket 20 so that the base portion 22 of the basket is located at a point that is furthest from the distal end 48 of the basket handle 44. This helps to permit easy submersion of the basket 20, the base portion 22 first, into a container of liquid for cooking.

In a most preferred embodiment, the basket handle 44 is formed from two parallel basket handle prongs 56 joined at the distal end 48 of the basket handle 44 and each prong 56 further having a free end 58 adjacent the basket 20. The free ends 58 are connectable to the basket 20 to mount the basket handle 44 to the basket 20. As shown in FIGS. 1 and 2, L-shaped tips 60 are formed on the free ends 58 of the basket handle prongs 56. The basket handle 44 biases the basket handle prongs 56 and the tips 60 away from each other. In the most preferred embodiment, the basket handle 44 is formed from a continuous piece of wire which terminates at the tips 60 of the basket handle prongs 56.

A bracket 64 is mounted in the interior of the basket 20 to the side wall portion 24 to receive the tips 60 of the basket handle 44. The bracket 64 is mounted to the side wall portion 36 with two rivets 66. The bracket has two downward stops 68, two upwards stops 70, and two outward stops 72 projecting from the bracket 64 toward the interior of the basket 20. These stops engage the tips 60 of basket handle prongs 56 of the basket handle 44 to mount the basket handle 44 to the basket 20. The downward stops 68 prevent the basket handle 44 from sliding toward the base portion 22 of the basket 20. The upward stops 70 prevent the basket handle 44 from moving upward away from the basket 20. The outward stops 72 prevent the tips 60 from moving apart. With this arrangement, the basket handle is releasably mountable to the basket, permitting easy exchangeability of baskets or basket handles and also aiding in reducing the size of the apparatus for packaging purposes.

To mount the basket handle 44 to the basket 20, the tips 60 of the basket handle are forced together against the biasing force applied by the basket handle such that the tips are able to clear the downward stops 68, the upward stops 70, and the outward stops 72 of the bracket 64 mounted to the basket 20. Once the tips 60 are released, the tips are biased outward to engage the outward stops 72. The basket handle 44 is prevented from sliding toward or away from the basket 20 by the tips 60 engaging the downward stops 68 and the upward stops 70, respectively. To remove the basket handle 44 from the basket 20, the tips 60 are forced together until they clear the stops. The basket handle 44 is then moved away from the bracket 20.

A sliding lock bar 74 is provided t releasably lock the basket handle 44 to the basket 20. The lock bar 74 is mounted to the basket handle prongs 56 and slides along the basket handle prongs between the tips 60 and the distal end 48 of the basket handle 44. When the lock bar 74 is pushed toward the distal end 48 of the basket handle 44, the tips 60 are movable toward each other if the biasing force of the basket handle is exceeded. When the lock bar 74 is pushed toward the tips 60, the tips are locked by the lock bar from lateral movement towards each other. The lock bar 74 is employed to lock the tips 60 relative to each other to prevent the tips from inadvertently being pushed toward each other and possibly disengaging from the bracket 64 during use of the shell maker apparatus 10. The lock bar 74 also limits movement of the tips away from each other when the basket handle 44 is disconnected from the basket 20.

As shown in FIGS. 1 and 2, the preferred embodiment of shell maker apparatus 10 has a support member 80 which is positionable adjacent the base portion 22 of the basket 20. In a more preferred embodiment, the support member 80 has a planar portion 82 as shown in FIG. 2. As best shown in FIG. 4, the planar portion 82 has a substantially circular ring portion 84 with an open interior for the passage of oil. As will be discussed below an open support member 80 permits oil to pass through the support member 80 to help produce a more desirable final product during submersive cooking of a food item. As shown in FIG. 4, the ring portion 84 does not completely form a circular ring, although a completely continuous circular ring portion could be employed. The support member 80 is preferably formed from a length of wire.

As shown in FIGS. 1 and 2, an elongate support handle arrangement or support handle 86 is attached to the support member 80 at one end 88 of the support handle. The support handle 86 extends away from the support member 80 toward a distal end 90 of the support handle 86. The distal end 90 of the support handle 86 provides a gripping surface 92 for holding or moving the support member 80 without directly handling the support member. The support handle 86 has an L-shaped cross sectional area as shown in FIG. 2. In a more preferred embodiment, the support handle 86 has a similar size and shape to the basket handle 44. The support handle 86 is attached to the support member 80 so that the planar portion 82 of the support member is located at a point that is furthest the distal end of the support handle 80. When the support handle 80 and the basket handle 44 are adjacent each other, the planar portion 82 of the support member 80 and the base portion 22 of the basket 20 are also positioned adjacent to each other. In a most preferred embodiment, the support handle 86 is of one piece with the support member 80 and is formed from two parallel support handle prongs 94. As best shown in FIG. 4, the support handle 86 can be formed from the same piece of wire that forms the support member 80. In that case, the wire extends from the ends of the circular ring portion 84 of the support member 80 toward the distal end 90 of the support handle 86.

A hinge 96 is provided on the shell maker apparatus 10 to join the support handle 86 to the basket handle 44. The hinge 96 permits the shell maker apparatus 10 to be a one piece unit. As shown in FIGS. 1 and 2, the hinge 96 is preferably located at the distal ends 48, 90 of both the basket handle 44 and the support handle 86. The hinge 96 also permits relative movement of the basket 20 and the support member 86 between the position of the shell maker apparatus 10 shown in FIG. 2 and the position of the shell maker apparatus shown in FIG. 4. When the shell maker apparatus 10 is in the position shown in FIG. 2, the planar portion 82 of the support member 80 and the base portion 22 of the basket 20 are in close proximity to one another. When the shell maker apparatus 10 is in the position shown in FIG. 4, the planar portion 82 of the support member 80 and the base portion 22 of the basket 20 are moved apart with respect to one another, exposing both the base portion of the basket and the planar portion of the support member. It should be noted that it is not critical that the hinge 96 be placed at the distal ends of both handles. The hinge 96 generally should be positioned to permit appropriate relative movement of the planar portion 82 of the support member 80 and the base portion 22 of the basket 20 from a position where the planar portion of the support member and the base portion of the basket are in close proximity to each other to a position where the planar portion and the base portion are exposed.

All of the elements of the shell maker apparatus 10 described above, excluding the basket 20 but including the basket handle 44, the lock bar 74, the bracket 64, the rivets 66, the support member 80, the support handle 86, and the hinge 96, can be made from any suitable material that is capable of withstanding the temperatures and stresses that the particular element of the shell maker apparatus is exposed to during the cooking process and during other aspects of use. In the preferred embodiment, all of the above elements, excluding the basket, can be formed from nickel plated steel.

Figure 5:
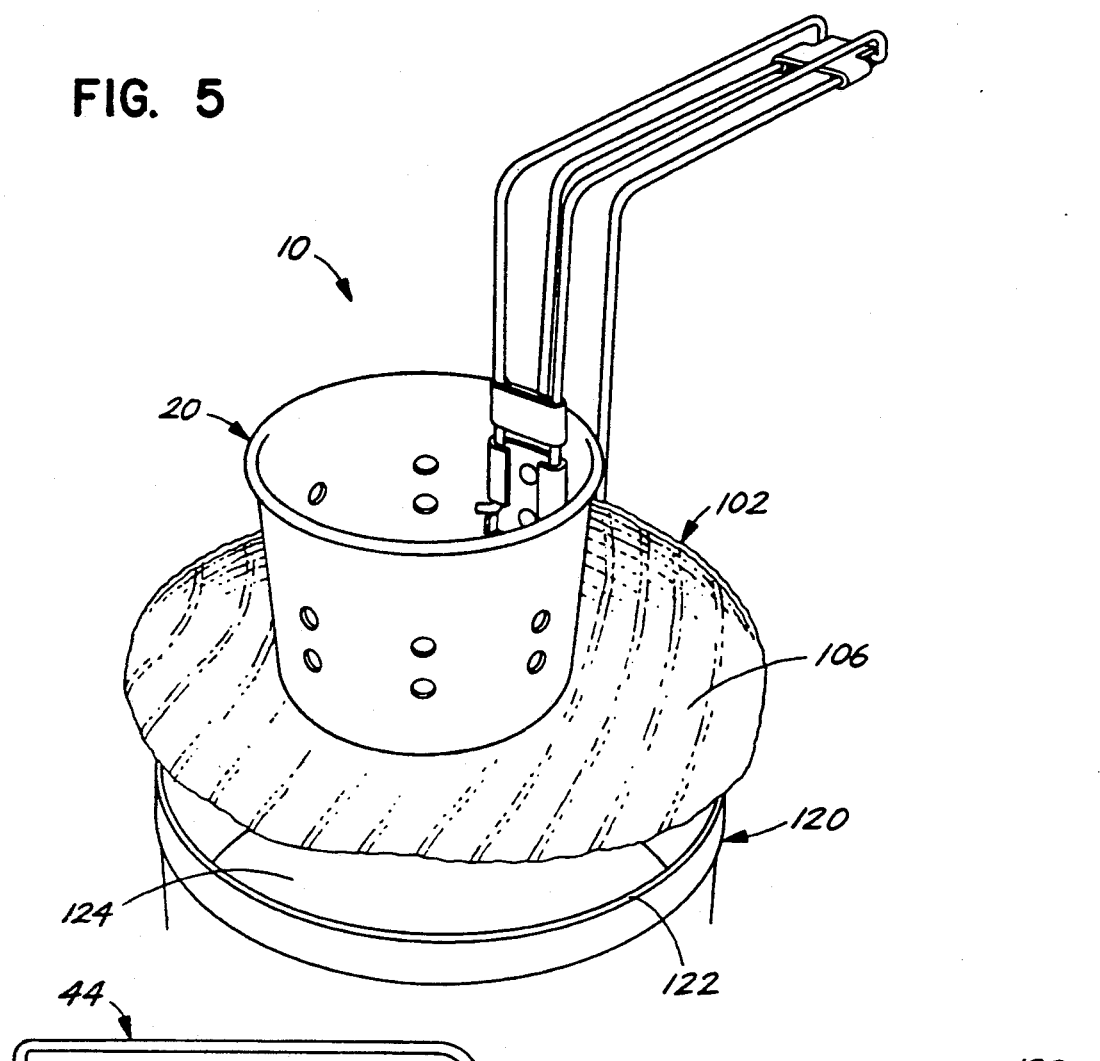
FIG. 5 is a partial perspective view of a fryer and a perspective view of the shell maker apparatus shown in FIG. 1 with a tortilla operatively positioned in the apparatus before submersion into a fryer.

FIG. 2 shows a thin, flat, flexible food item 100 positioned between the base portion 22 of the basket 20 and the planar portion 82 of the support member 80. The food item 100 is of the type that upon cooking in oil becomes rigid. The food item is also preferably buoyant in oil. In a more preferred embodiment, the food item is a flexible tortilla that has a substantially circular shape. Typically, tortillas are made with corn or flour. In a most preferred embodiment, a flour tortilla which is buoyant in oil is used. FIG. 5 shows a tortilla 102 positioned in the shell maker apparatus 10 prior to submersion in a fryer 120 containing oil 124.

Figure 6:
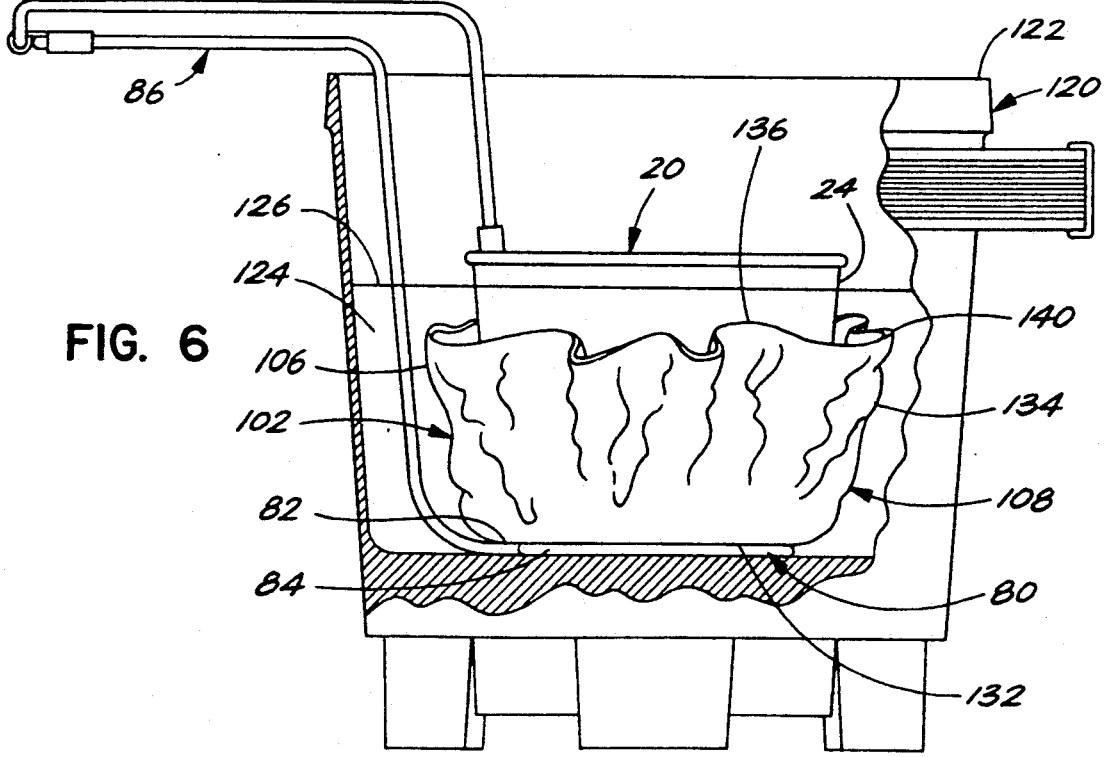
FIG. 6 is a side view of the shell maker apparatus and tortilla shown in FIG. 5 and a partial cut away side view of the fryer showing the apparatus and tortilla after submersion into the fryer.

The fryer 120 shown in FIGS. 5 and 6 is an example of one kind of fryer that can be used to cook the tortilla 102 in oil. While the fryer shown has an upper rim 122 that has a diameter less than the diameter of the tortilla 102, it should be noted that any sized fryer could be used as long as the fryer is sufficiently sized to permit submersion of the shell maker apparatus 10 and tortilla 102 into the fryer.

As discussed above, the basket 22 and the support member 80 of the shell maker apparatus 10 are movable relative to each other. Because of the relative movement, in a more preferred embodiment, a center portion 104 of the tortilla 102 is gripable, pinchable, or pressable between the planar portion 82 of the support member 80 and the base portion 22 of the basket 20, as is shown in FIG. 2. The tortilla 102 has a diameter of a major surface greater than a diameter of the base portion 22. As shown in FIGS. 2 and 5, the part of the tortilla that extends beyond the base portion 22 of the basket 20 is an outer periphery 106 which surrounds the center portion 104 of the tortilla 102. The outer periphery 106 of the tortilla 102 is bendable or foldable relative to the center portion 104 of the tortilla which is pressed between the support member and the basket.

The shell maker apparatus 10 permits bending or folding of a portion of the outer periphery 106 of the tortilla 102 while the center portion 104 of the tortilla is pressed between the planar portion 82 of the support member 80 and the base portion 22 of the basket 20. As shown in FIG. 6, the shell maker apparatus 10 forms the tortilla 102 into a bowl-shaped shell 108 after submersion by permitting a portion of the outer periphery 106 of the tortilla 102 to be folded by the oil 124. The oil may fold the tortilla through movement of the tortilla and the basket through the oil or through the natural buoyancy of the tortilla or through both methods.

If the tortilla 102 is buoyant in oil, as in the preferred embodiment, upon submersion into the oil 124, the outer periphery 106 of the tortilla 102 will float toward the surface to fold the outer periphery relative to the center portion 104 forming the bowl-shaped shell 108. The oil in the fryer should be deep enough to completely cover the tortilla when it is folded into the bowl shape. In FIG. 6, an oil line 126 represents the level of the oil in the fryer 120 which in this case completely covers the bowl-shaped shell 108.

In the preferred embodiment, the tortilla 102 has a portion of the outer periphery 106 which is foldable from an initial position away from the side wall portion 24 of the basket 20 to a position adjacent the side wall portion when the center portion 104 is pressed between the planar portion 82 of the support member 80 and the base portion 22 of the basket 20. In a more preferred embodiment, the portion of the outer periphery 106 of the tortilla 102 is capable of being folded from a position at least from a plane of the base portion 22 to a position adjacent the side wall portion 24. The amount of actual folding that occurs will depend on the initial position of the tortilla prior to folding. As shown in FIG. 2, a portion of the outer periphery 106 of the tortilla 102 adjacent the support handle 86 is foldable to a lesser extent than the rest of the outer periphery. However, most of the outer periphery is capable of being folded at least between the plane of the base portion and the side wall portion. The rounded portion 30 of the basket 22 between the base portion 22 and the side wall portion 24 helps to prevent tearing of the tortilla 102 during folding of the outer periphery relative to the center portion. Once the tortilla 102 is folded to form around the basket 22, the tortilla is cooked until it is rigid.

In the preferred embodiment, the base portion perforations 34 in the base portion 22 of the basket 20 permit the passage of oil through the base portion. In addition, the side wall portion perforations 36 in the side wall portion 24 of the basket permit the passage of oil through the side wall portion. By permitting oil to pass through the walls of the basket 20, the tortilla 102 is cooked more evenly on the inside than if there were no perforations in basket. Similarly, the ring portion 84 of the support member 80 has an open interior to permit the oil to better contact the exterior surface of the base 132 of the shell 108.

When the flat tortilla 102 is bent or folded into the bowl-shaped shell 108, the outer periphery 106 of the tortilla will have more material than is necessary to form the sides of the bowl-shaped shell. This excess material forms into fins 140 along the sides 134 of the shell 108. FIG. 6 shows the location of the fins 140 formed in the shell. In addition, bubbles, fold or other imperfections may form in the shell 108 during cooking. Once the shell 108 becomes rigid, the shell is easily broken. The shell maker apparatus 10 reduces the likelihood of structure interfering with the fins or bubbles on the rigid shell to reduce the problem of breakage of the shell during removal of the rigid shell from the apparatus after cooking. The side wall portion 24 of the basket 20 in the preferred embodiment has a porosity to the passage of oil which is no greater than one-half of the total area of the side wall portion which is adjacent the sides 134 of the bowl-shaped shell 108. With a porosity of no greater than one-half of the total area of the side wall portion 24, the side wall portion is less likely to interfere with the fins and bubbles of the rigid shell while still permitting better cooking of the shell. In a more preferred embodiment, the basket has a porosity to the passage of oil which is no greater than one-fourth of the total area of the side wall portion which is adjacent the sides 134 of the bowl-shaped shell 108. With a porosity of no more than one-fourth, the side wall portion is even less likely to interfere with the rigid shell. In a most preferred embodiment, the side wall portion is at least somewhat porous to the passage of oil to facilitate better cooking of the food item 100.

In a most preferred embodiment, the basket 20 that has a height from the base portion 22 to rim 32 of approximately 2.5 to 3.5 inches high with an approximately 4 inch inside diameter at the rim. Preferably, the basket has an inverse taper from the longitudinal axis of the basket from the rim 32 of the basket 20 toward the base portion 22 of the basket 20 which is greater than zero degrees. More preferably, the taper is between one and ten degrees. A basket having the above dimensions can form a typical 8-inch diameter flour tortilla into a bowl-shaped shell having a height of approximately 2.0-2.5 inches and a top outside diameter of approximately 5.0-6.0 inches, which tapers down to a base having a smaller diameter. A basket having the dimensions given above most preferably further has 10 to 20 0.1 to 0.4 inch diameter round side wall portion perforations 36 formed in the side wall portion 24 to permit the oil to pass through the side wall portion. The side wall portion perforations 36 are spaced around the side wall portion 24 and are typically located towards the midpoint of the side wall portion. A basket configured in the manner described above is even less likely to interfere with the rigid fins and bubbles of the shell during removal of the shell from the cooking apparatus yet still permit the oil to pass through the side wall portion to facilitate better cooking of the tortilla.

As the tortilla 102 is formed into a bowl-shaped shell 108, the fins 140 will become larger as the depth of the shell increases relative to the dimensions of the base 132 of the shell. The shell maker apparatus 10 of the present invention reduces the likelihood of interference with the formation of the fins and also permits the fins to be properly cooked once formed. In a preferred embodiment, the side wall portion 24 of the basket 20 has a minimum upward dimension from the base portion 22 of the basket 20 to the rim 32 of the basket 20 of at least one-third the diameter of the base portion. With these dimensions, a relatively deep bowl-shaped shell 108 will be formed with properly formed and cooked fins. In a more preferred embodiment, the side wall portion 24 of the basket 20 has a minimum upward dimension from the base portion 22 of the basket 20 to the rim 32 of the basket 20 of at least one-half of the diameter of the base portion. In a most preferred embodiment, the side wall portion 24 of the basket 20 has a minimum upward dimension from the base portion 22 of the basket 20 to the rim 32 of the basket 20 of at least 60 percent of the diameter of the base portion.

Figure 7:
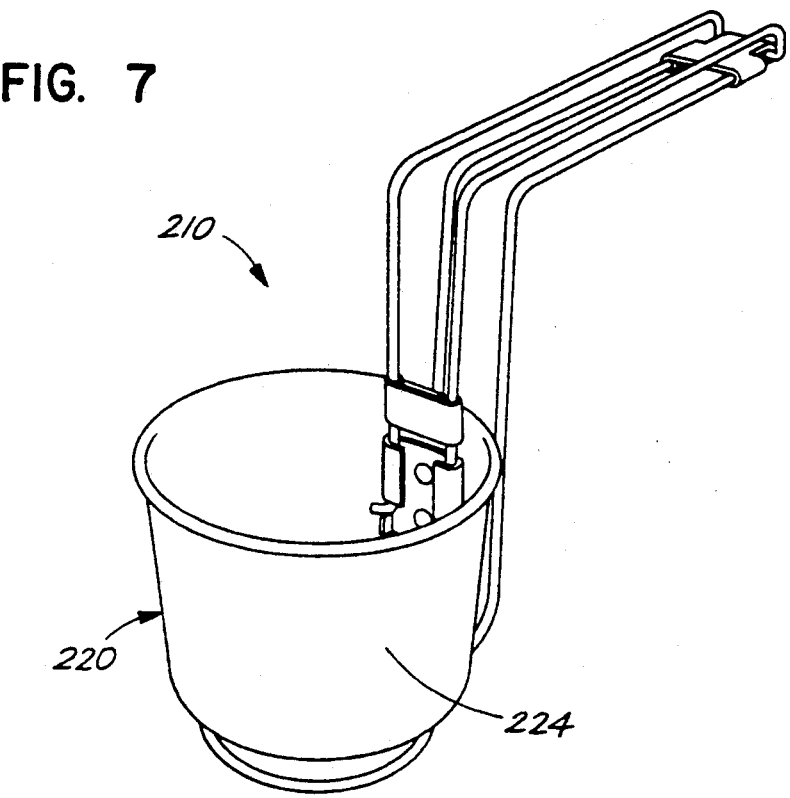
FIG. 7 is a perspective view of an alternative embodiment of the shell maker apparatus.

In an alternative embodiment shown in FIG. 7, the shell maker apparatus 210 has a basket 220 which has a side wall portion 224 which is not porous to the passage of oil. The rest of the alternative embodiment is similar to the first preferred embodiment. In the alternative embodiment, oil is still permitted to pass through the base portion of the basket. However, the basket does not fill as fast as it would if side wall perforations were present.

In operation, the shell maker apparatus 10 is first assembled by mounting the basket handle 44, which includes the support member 80 and support handle 86 pivotally attached to the basket handle to the basket 20. The basket handle 44 is mounted to the basket by sliding the lock bar 74 up the basket handle prongs 56 of the basket handle 44 such that the tips 60 can be pushed toward each other sufficiently to clear the upward stops 70, the downward stops 68, and the outward stops 72 of the bracket 20 mounted to the basket. After the tips 60 are released, the tips engage the bracket 64 to mount the basket handle to the basket. The lock bar 74 is next moved down the prongs 56 toward the basket 20 to lock the tips 60 from motion toward each other to prevent inadvertently disengaging the basket handle from the basket.

Once the basket handle 44 is attached to the basket 20, the tortilla 102 is loaded into the shell maker apparatus 10. As an example, an 8 inch diameter, flour tortilla, buoyant in oil, is provided. The basket 20 has the same size as described above for a most preferred embodiment. The tortilla 102 can be loaded in the shell maker apparatus 10 in several different ways. The shell maker apparatus 10 can be loaded by rotating the basket 20 upward away from the support member 80 to the position illustrated in FIG. 4, placing the tortilla 102 centered on the support member, and rotating the basket back toward the support member. The shell maker apparatus can also be loaded by turning the apparatus upside down relative to the position shown in FIG. 2, rotating the support member upward away from the basket, placing the tortilla centered on the basket, and rotating the support member back toward the basket. In this position, the outer portion of the tortilla will be folded in a downward fashion around the basket. Upon returning the apparatus to the upright position, the outer periphery will fold away from the basket. The shell maker apparatus can also be loaded by rotating the support member and the basket away from each other, placing the tortilla between the basket and the support member, and rotating the support member and the basket toward each other. Once the tortilla is positioned between the basket and the support member, the support handle 80 and the basket handle 44 are pushed together to securely press the center portion 104 of the tortilla 102 between the base portion 22 of the basket 20 and the planar portion 82 of the support member 80.

The shell maker apparatus 10 with the tortilla 102 pressed between the basket 20 and the support member 80 is lowered, support member first, into the fryer 120 containing heated oil 124. As part of this same example, the tortilla will be cooked adequately if the fryer contains oil heated to a temperature in the range of 350–450 degrees Fahrenheit. Because the tortilla is buoyant in oil, the outer periphery 106 of the tortilla 102 will begin to float toward the surface of the oil. As the outer periphery of the tortilla floats upward, the center portion 104 of the tortilla remains pressed between the support member 80 and the basket 20. The buoyancy of the outer periphery 106 of the tortilla causes the outer periphery to fold or bend relative to the center portion 104 to form the tortilla into the bowl shape around the basket. The apparatus and the tortilla are maintained in the oil until the tortilla is cooked rigid.

During the cooking process, the oil passes through the base portion perforations 34 to permit proper cooking of the tortilla. If side wall perforations 36 are present, oil will also pass through the side wall portion perforations. As the basket begins to fill with oil, the force required to maintain the basket in the oil will become less. After awhile, the level of the oil in the basket will be the same, or almost the same, as the level outside the basket. If no side wall portion perforations are present, the basket will take longer to fill.

Once the tortilla 102 is cooked rigid, the shell maker apparatus 10 and the tortilla are lifted upward. Because the basket 20 has base portion perforations 34 and possibly side wall portion perforations 36, oil that was in the basket 20 flows out from the basket into the bowl-shaped shell 108. Some oil will drain through the shell and fall back into the fryer. To return the oil back to the fryer quickly, the apparatus is rotated until the oil pours back into the fryer. When the side wall perforations are present, the oil flows out faster from the basket into the shell. This permits the oil to be poured back from the shell only without having to wait a long period of time. By permitting the oil to be poured back into the fryer from the shell only, the oil does not have to be poured back from the basket, which is significantly higher at the rim 32 than a lip 136 of the shell, possibly creating a situation where the oil is more likely to be spilled, and instead can be poured back from the lip 136 of the shell into the fryer.

Once most of the oil has drained back into the fryer 120, the shell 108 is removed from the apparatus 10 by rotating the support member 80 and the basket 20 away from each other and removing the shell 108 from the apparatus. The shell maker apparatus 10 can be cleaned and put away until later use or the apparatus can be used again to make additional shells.

METHOD

According to the present invention, a method is provided for forming a flexible food item into a rigid bowl-shaped shell. The flexible food item, typically a substantially circular tortilla, is formed into a rigid bowl-shaped shell, like that illustrated in FIG. 6, during submersive cooking in oil. A center portion of the food item is gripped, pinched or pressed like the tortilla 102 is as shown in FIGS. 2 and 5. An outer periphery of the food item is bent or folded by the oil during submersion to form the food item into the bowl-shaped shell as illustrated in FIG. 6, which shows the outer periphery 106 of the tortilla 102 folded with respect to the center portion 64.

A cooking apparatus like that illustrated in the Figures may be provided to form the food item into the bowl-shaped shell. The cooking apparatus 10 preferably has a support member 80 and a basket 20. The basket has a flat base portion 22 and a side wall portion 24. The center portion of the food item is pressed between the base portion and the planar portion. By submersing the basket, the support member, and the food item in a fryer containing oil, as shown in FIG. 6, the food item will be formed by the oil around the basket into a bowl shape.

After submersion, the food item is cooked for a sufficient time until the food item becomes rigid and retains its bowl shape. The bowl-shaped shell is removed from the apparatus by first moving the support member away from the basket and then removing the shell from the apparatus.

If a buoyant food item is used, after submersion, the outer periphery of the food item will float toward the surface and fold the outer periphery relative to the center portion to form the food item into a bowl-shaped shell.

It is to be understood that while certain embodiments of the present invention have been illustrated and described, it is not limited to specific forms or arrangements herein described and shown.

What is claimed is:

1. An apparatus for use in forming a flexible tortilla into a rigid bowl-shaped shell during submersive cooking in oil; the tortilla having a center portion and an outer periphery surrounding the center portion; said apparatus comprising:
   (a) a basket having a base portion and a side wall portion extending generally upwards from said base portion, said side wall portion having an upward dimension at least one-third as great as a diameter of said base portion, said side wall portion further having a porosity no greater than one-half of a total area of said side wall portion;
   (b) a basket handle having a first end connected to said basket and extending from said basket to a distal end; and
   (c) support means for pressing the center portion of the tortilla against said base portion, said support means permitting the oil to fold at least a portion of the outer periphery of the tortilla extending beyond said base portion from at least a position in a plane defined by said base portion to a position adjacent said side wall portion during submersive cooking while the center portion of the tortilla is pressed against said base portion of said basket, said support means comprising:
      (i) a support member including a planar ring portion, said planar ring portion having an open interior to the passage of oil, said planar ring portion having an outer perimeter defining an area less than or equal to an area defined by the outer perimeter of said base portion of said basket;
      (ii) a support handle having a first end connected to said support member and extending from said support member to a distal end; and
      (iii) means for pivotally connecting said distal end of said basket handle to said distal end of said support member, said basket and said support member being pivotally movable to a first position for pressing the center portion of the tortilla between said base portion of said basket and said planar portion of said support member, said basket and said support member being pivotally movable to a second spaced apart position for loading and unloading the tortilla from said apparatus.

2. The apparatus of claim 1, wherein said basket has a substantially truncated conical shape with one end having a smaller diameter than an opposite end, said base portion being located at the end of said basket having the smaller diameter.

3. The apparatus of claim 2, wherein said side wall portion extends at least 2.5 inches and includes a plurality of holes between about 0.1 and 0.4 inches in diameter for oil to pass through said side wall portion.

4. The apparatus of claim 1, wherein said planar ring portion of said support member defines a substantially circular arc.

5. The apparatus of claim 1, wherein said base portion of said basket is porous to the passage of oil therethrough.

6. The apparatus of claim 1, wherein said basket handle includes means for selectively mounting said basket handle to said basket; and wherein said basket includes means for receiving said means for selectively mounting whereby said basket and said basket handle can be selectively mounted to one another.

7. The apparatus of claim 6, wherein said means for selectively mounting includes means for releasably locking said basket handle to said basket.

8. An apparatus for use in forming a flexible tortilla into a rigid bowl-shaped shell during submersive cooking in oil; the tortilla having a center portion and an outer periphery surrounding the center portion; said apparatus comprising:
   (a) a basket having a base portion and a side wall portion extending generally upwards from said base portion, said side wall portion having an upward dimension at least one-third as great as a diameter of said base portion, said side wall portion further having a porosity no greater than one-half of a total area of said side wall portion;
   (b) support means for pressing at least a portion of the center portion of the tortilla against said base portion said support means permitting the oil to fold at least a portion of the outer periphery of the tortilla extending beyond said base portion from at least a position in a plane defined by said base portion to a position adjacent said side wall portion during submersive cooking while the central portion of the tortilla is pressed against said base portion of said basket, the support means comprising:
      (i) a support member having an outer perimeter defining an inner area less than an area defined by the outer periphery of the tortilla; and
      (ii) means for pivotally connecting said basket to said support member, said basket and said support member being pivotally movable to a first position for pressing the center portion of the tortilla between said base portion of said basket and said support member with at least a portion of the outer periphery of the tortilla extending beyond said base portion, said basket and said support member being pivotally movable to a second spaced apart position for loading and unloading the tortilla from said apparatus.

9. The apparatus of claim 8, wherein said support member includes a planar support portion for supporting the tortilla, said planar support portion defining a substantially circular arc.

10. The apparatus of claim 8, wherein said base portion and said side wall portion form a substantially truncated conical basket with at least one end, said base portion being located at the end of said basket having the smaller diameter.

11. The apparatus of claim 8, wherein said side wall portion has zero porosity to the passage of oil therethrough.

12. An apparatus for use in forming a flexible tortilla into a rigid bowl-shaped shell during submersive cooking in oil; the tortilla having a center portion and an outer periphery surrounding the center portion; said apparatus comprising:
   (a) a basket having a base portion and a side wall portion extending generally upwards from said base portion, said side wall portion having a porosity no greater than one-half of a total area of said side wall portion;

(b) a support member having an outer perimeter defining an inner area less than an area defined by the outer periphery of the tortilla; and (c) means for handling said basket and means for handling said support member wherein said base portion of said basket is positionable adjacent said support member to press at least a portion of the center portion of the tortilla between the base portion of said basket and said support member with at least a portion of the outer periphery of the tortilla extending beyond said base portion, and wherein said base portion and at least a portion of said side wall portion of said basket and said support member are submersible in oil to cook the tortilla wherein at least a portion of the outer periphery of the tortilla extending beyond the base portion is foldable by the oil after submersion from at least a position in a plane defined by said base portion to a position adjacent said side wall portion.

13. The apparatus of claim 12, wherein said support member has a planar portion engageable with the tortilla during operation, said planar portion defining a substantially circular arc, and wherein said basket has a substantially truncated conical shape with one end having a smaller diameter than an opposite end, said base portion being located at the end of said basket having the smaller diameter.

14. The apparatus of claim 12, wherein said means for handling said basket includes an elongate basket handle attached to said basket at a first end of said basket handle and extending from said basket to a distal end of said basket handle; and said means for handling said support includes an elongate support handle attached to said support member at a first end of said support handle and extending from said support member to a distal end of said support handle; and said distal end of said support handle being pivotally attached to said distal end of said basket handle whereby said basket is movable with respect to said support member.

15. The apparatus of claim 12, wherein said side wall portion of said basket has zero porosity to the passage of oil.

* * * * *

UNITED STATES PATENT AND TRADEMARK OFFICE
CERTIFICATE OF CORRECTION

PATENT NO. : 5,072,664
DATED : December 17, 1991
INVENTOR(S) : Tienor et al.

It is certified that error appears in the above-identified patent and that said Letters Patent is hereby corrected as shown below:

Column 1, lines 60 & 61
    DELETE "and or" and INSERT therefor --and/or--.

Column 3, line 19
    INSERT --the-- after the word "of".

Column 4, line 68
    INSERT --the-- after the word "and".

Column 6, lines 10 & 11
    DELETE "cross sectional" and INSERT therefor "cross-sectional".

Column 6, line 62
    DELETE "bracket" and INSERT therefor --basket--.

Column 6, line 63
    DELETE "t" and INSERT therefor --to--.

Column 7, line 37
    DELETE "cross sectional" and INSERT therefor --cross-sectional--.

Column 8, line 47
    DELETE "22" and INSERT therefor --20--.

Column 9, lines 35 and 40
    DELETE "22" and INSERT therefor --20--.

Column 9, line 59
    DELETE "fold" and INSERT therefor --folds--.

UNITED STATES PATENT AND TRADEMARK OFFICE
CERTIFICATE OF CORRECTION

PATENT NO. : 5,072,664

DATED : December 17, 1991

INVENTOR(S) : Tienor et al.

It is certified that error appears in the above-identified patent and that said Letters Patent is hereby corrected as shown below:

Column 11, line 14
    DELETE "20" and INSERT therefor --64--.

Column 12, line 52
    DELETE "64" and INSERT therefor --104--.

Column 14, line 32 (claim 8(b))
    DELETE "central" and INSERT therefor --center--.

Signed and Sealed this

Thirteenth Day of July, 1993

Attest:

MICHAEL K. KIRK

Attesting Officer    Acting Commissioner of Patents and Trademarks